United States Patent [19]
Tsuchida et al.

[11] Patent Number: 5,476,151
[45] Date of Patent: Dec. 19, 1995

[54] STRUCTURE FOR ARRANGING AUXILIARY COMPONENTS OF AN ELECTRIC VEHICLE

[75] Inventors: Takuji Tsuchida, Shizuoka; Junichi Harada, Aichi; Toyohiko Eto, Aichi; Katsuhisa Hasegawa, Aichi; Tomoo Suzuki, Kanagawa; Tadahiko Fuse, Kanagawa; Keiji Kunikita, Kanagawa, all of Japan

[73] Assignees: Toyota Jidosha Kabushiki Kaisha, Toyota; Kanto Jidosha Kogyo Kabushiki Kaisha, Yokosuka, both of Japan

[21] Appl. No.: 200,684

[22] Filed: Feb. 23, 1994

[30] Foreign Application Priority Data

Mar. 19, 1993 [JP] Japan ..................................... 5-060254

[51] Int. Cl.⁶ .............................. B60K 1/00; B60K 28/10
[52] U.S. Cl. ........................................... 180/274; 180/68.5
[58] Field of Search ................................. 180/68.5, 274, 180/232, 65.1, 297; 280/784

[56] References Cited

U.S. PATENT DOCUMENTS

| | | | |
|---|---|---|---|
| 1,911,401 | 5/1933 | Scott | 180/68.5 |
| 3,347,501 | 10/1967 | Van Eimeren | 180/232 |
| 5,372,216 | 12/1994 | Tsuji et al. | 180/274 |

FOREIGN PATENT DOCUMENTS

| | | | |
|---|---|---|---|
| 559176 | 9/1993 | European Pat. Off. | 280/784 |
| 2152136 | 4/1973 | Germany | 180/232 |
| 57-139431 | 8/1982 | Japan . | |
| 58-63520 | 4/1983 | Japan | 180/297 |

*Primary Examiner*—Karin Tyson
*Attorney, Agent, or Firm*—Oblon, Spivak, McClelland, Maier & Neustadt

[57] ABSTRACT

A structure for arranging an auxiliary component of an electric vehicle has an auxiliary-component moving device for moving an auxiliary component disposed in a front body such that an overall length of the auxiliary component becomes less than an original overall length of the auxiliary components in a case where the front body is compressed and deformed. It is possible to reduce the amount of an impact load which is transmitted from an object located in front of the vehicle to a vehicle compartment by means of the auxiliary component.

25 Claims, 20 Drawing Sheets

STRUCTURE FOR ARRANGING AUXILIARY COMPONENTS OF AN ELECTRIC VEHICLE

BACKGROUND OF THE INVENTION

1. Field of the Invention

The present invention relates to a structure for arranging an auxiliary component of an electric vehicle, and more particularly to a structure for arranging auxiliary components of an electric vehicle in which the auxiliary components are disposed above a motor within a front body.

2. Description of the Related Art

Electric vehicles used as non-polluting vehicles, which are free of exhaust gases and noise, generally employ ac motors or dc motors as driving sources. As shown in FIG. 21, such a motor 80 is usually disposed in a lower portion of the interior of a front body 82A of a vehicle body 82. Also, auxiliary components 84, 86, and 88, such as an inverter, an auxiliary battery, and an inverter for an airconditioner, are disposed in an upper portion of the interior of the front body 82A. It should be noted that Japanese Utility Model Application Laid-Open No. 57-139431 is known as a related technology.

As shown in FIG. 22, an automobile is generally adapted such that a front side member 90 is compressed and deformed to decrease an impact acting from an object located in front of the automobile, thereby allowing the front body 82A to be compressed and deformed.

However, with the electric vehicle with the motor 80 mounted thereon, auxiliary components disposed in the upper portion of the interior of the front body 82A are more numerous than in the case of ordinary automobiles. Some of the auxiliary components are large in size. Accordingly, in the event that an impact has acted from the object located in front of the vehicle body and the front body 82A is compressed and deformed, as shown in FIG. 22, a post-compression length L2 of the upper portion of the interior of the front body 82A where the auxiliary components 84, 86, and 88 are disposed becomes longer than a post-compression length L1 of the lower portion of the interior of the front body 82A where the motor 80 and front wheels 92 are disposed. Hence, there is the risk of the impact load being transmitted to the vehicle compartment by means of the auxiliary components 84, 86, and 88.

SUMMARY OF THE INVENTION

In view of the above-described circumstances, it is an object of the present invention to provide a structure for arranging an auxiliary component of an electric vehicle which is capable of reducing the amount of an impact load transmitted to a vehicle compartment from an object located in front of a vehicle body by means of the auxiliary component.

To this end, in accordance with a first aspect of the present invention, there is provided a structure for arranging an auxiliary component of an electric vehicle, comprising: an auxiliary component disposed in a front body of the electric vehicle; and auxiliary-component moving means for moving the auxiliary component such that an overall length of the auxiliary component in a longitudinal direction of the vehicle becomes less than an original overall length of the auxiliary component in a case where the front body is compressed and deformed.

In the above-described structure, in the event that the front body is compressed and deformed by an impact load from an object located in front of the vehicle body, the auxiliary component is moved by the auxiliary-component moving means such that the overall length of the auxiliary component becomes less than the original overall length of the auxiliary component. Accordingly, it is possible to reduce the amount of the impact load which is transmitted from the object located in front of the vehicle body in the rearward direction of the vehicle body via the auxiliary component. Hence, it is possible to reduce the amount of the impact load applied to the vehicle compartment from the object located in front of the vehicle body.

In the case where the front body is compressed and deformed, the auxiliary-component moving means is capable of moving the auxiliary component such that the overall length of the auxiliary component becomes less than an overall length of the front body existing after the front body is compressed and deformed. The auxiliary-component moving means may comprise links, and a plurality of auxiliary components may be coupled to each other by means of the links, coupling points at opposite ends of the links being arranged on both sides of a longitudinal axis of the vehicle.

In this structure, when the plurality of auxiliary components are pressed in the rearward direction by the impact load from the object located in front of the vehicle, the auxiliary component moves in a direction in which it moves further away from the longitudinal axis of the vehicle due to the operation of the links. Accordingly, since the overall length of the auxiliary components becomes less than the original overall length of the auxiliary components, it is possible to reduce the amount of the impact load which is transmitted from the object located in front of the vehicle body in the rearward direction of the vehicle body via the auxiliary components. Hence, it is possible to reduce the amount of the impact load applied to the vehicle compartment from the object located in front of the vehicle body. In addition, the plurality of auxiliary components, after being moved, are held securely by means of the links.

The auxiliary-component moving means may comprise a front hood which moves upwardly when the front body is compressed and deformed, an engaging portion provided in the front hood, and a portion to be engaged which is provided in at least one of the plurality of auxiliary components and engages the engaging portion when the front body is compressed and deformed.

In this structure, when the front body is compressed and deformed, the front hood is moved upwardly. At this time, the portion to be engaged which is provided in at least one of the plurality of auxiliary components engages the engaging portion provided in the front hood, and the portion to be engaged moves upwardly together with the front hood. Accordingly, since the overall length of the auxiliary components becomes less than the original overall length of the auxiliary components, it is possible to reduce the amount of the impact load which is transmitted from the object located in front of the vehicle body in the rearward direction of the vehicle body via the auxiliary components. Hence, it is possible to reduce the amount of the impact load applied to the vehicle compartment from the object located in front of the vehicle body. In addition, the plurality of auxiliary components, after being moved, are held securely by means of the engagement between the engaging portion and the portion to be engaged.

The auxiliary-component moving means may comprise brackets for mounting a plurality of auxiliary components in the front body along the longitudinal direction of the vehicle in a state in which the plurality of auxiliary components are inclined. In this structure, since the plurality of auxiliary components are mounted in the front body along the longitudinal direction of the vehicle by means of the brackets in a state in which the plurality of auxiliary components are inclined, when the front body is compressed and deformed, the front body is deformed upwardly, and the plurality of auxiliary components are superposed one on top of the other while rotating to their vertical positions. Accordingly, since the overall length of the auxiliary components becomes less than the original overall length of the auxiliary components, it is possible to reduce the amount of the impact load which is transmitted from the object located in front of the vehicle body in the rearward direction of the vehicle body via the auxiliary components. Hence, it is possible to reduce the amount of the impact load applied to the vehicle compartment from the object located in front of the vehicle body. In addition, the plurality of auxiliary components, after being moved, are held securely by means of the brackets.

The auxiliary-component moving means may comprise a bending-mode member on which a plurality of auxiliary components are mounted and which is adapted to be bent when the front body is compressed and deformed. In this structure, when the front body is compressed and deformed, the bending-mode member on which the plurality of auxiliary components are mounted is bent. Consequently, the row of the auxiliary components is bent along the bending-mode member. Accordingly, since the overall length of the auxiliary components becomes less than the original overall length of the auxiliary components, it is possible to reduce the amount of the impact load which is transmitted from the object located in front of the vehicle body in the rearward direction of the vehicle body via the auxiliary components. Hence, it is possible to reduce the amount of the impact load applied to the vehicle compartment from the object located in front of the vehicle body. In addition, the plurality of auxiliary components, after being moved, are held securely by means of the bending-mode member.

The bending-mode member may comprise the front hood. Accordingly, it is unnecessary to provide a separate bending-mode member, so that it is possible to prevent an increase in weight and cost.

The auxiliary-component moving means may comprise a battery carrier which is fixed to a lower portion of the vehicle body in such a manner as to be capable of being cut off therefrom during a sudden deceleration of the vehicle, and is coupled to at least one of a plurality of auxiliary components, so as to move the auxiliary components by moving during a sudden deceleration of the vehicle. In this structure, the battery carrier which is fixed to the lower portion of the vehicle body is cut off from the vehicle body during a sudden deceleration of the vehicle, and moves in the forward direction of the vehicle. Consequently, at least one of the plurality of auxiliary components connected to the battery carrier is moved in a direction in which the overall length of the auxiliary components becomes less than the original overall length of the auxiliary components. Accordingly, since the overall length of the auxiliary components becomes less than the original overall length of the auxiliary components, it is possible to reduce the amount of the impact load which is transmitted from the object located in front of the vehicle body in the rearward direction of the vehicle body via the auxiliary components. Hence, it is possible to reduce the amount of the impact load applied to the vehicle compartment from the object located in front of the vehicle body.

In accordance with a second aspect of the present invention, the structure for arranging an auxiliary component of an electric vehicle comprises: a highly rigid member disposed in a front body of the electric vehicle; an auxiliary component disposed in the front body; and auxiliary-component moving means for moving the auxiliary component such that an overall length of the auxiliary component in a longitudinal direction of the vehicle becomes less than an overall length, in the longitudinal length of the vehicle, of a space formed by the highly rigid member in a case where the front body is compressed and deformed.

In this structure, in the event that the front body is compressed and deformed by an impact load from an object located in front of the vehicle body, the overall length of the front body becomes a length corresponding to the space defined or formed by the highly rigid member (a motor, a sub-frame, wheels, etc.) which practically does not undergo compression and deformation. Meanwhile, the auxiliary component is moved by the auxiliary-component moving means such that the overall length of the auxiliary component becomes less than the overall length of the space defined or formed by the highly rigid member. Accordingly, it is possible to reduce the amount of the impact load which is transmitted from the object located in front of the vehicle body in the rearward direction of the vehicle body via the auxiliary component. Hence, it is possible to reduce the amount of the impact load applied to the vehicle compartment from the object located in front of the vehicle body.

Since the structure for arranging auxiliary components of an electric vehicle in accordance with this embodiment is arranged as described above, an outstanding advantage is offered in that it is possible to reduce the amount of an impact load transmitted from an object located in front of the vehicle to the vehicle compartment by means of the auxiliary components.

The other objects, features and advantages of the present invention will become more apparent from the following detailed description of the invention when read in conjunction with the accompanying drawings.

DESCRIPTION OF THE PREFERRED EMBODIMENTS

Figure 1:
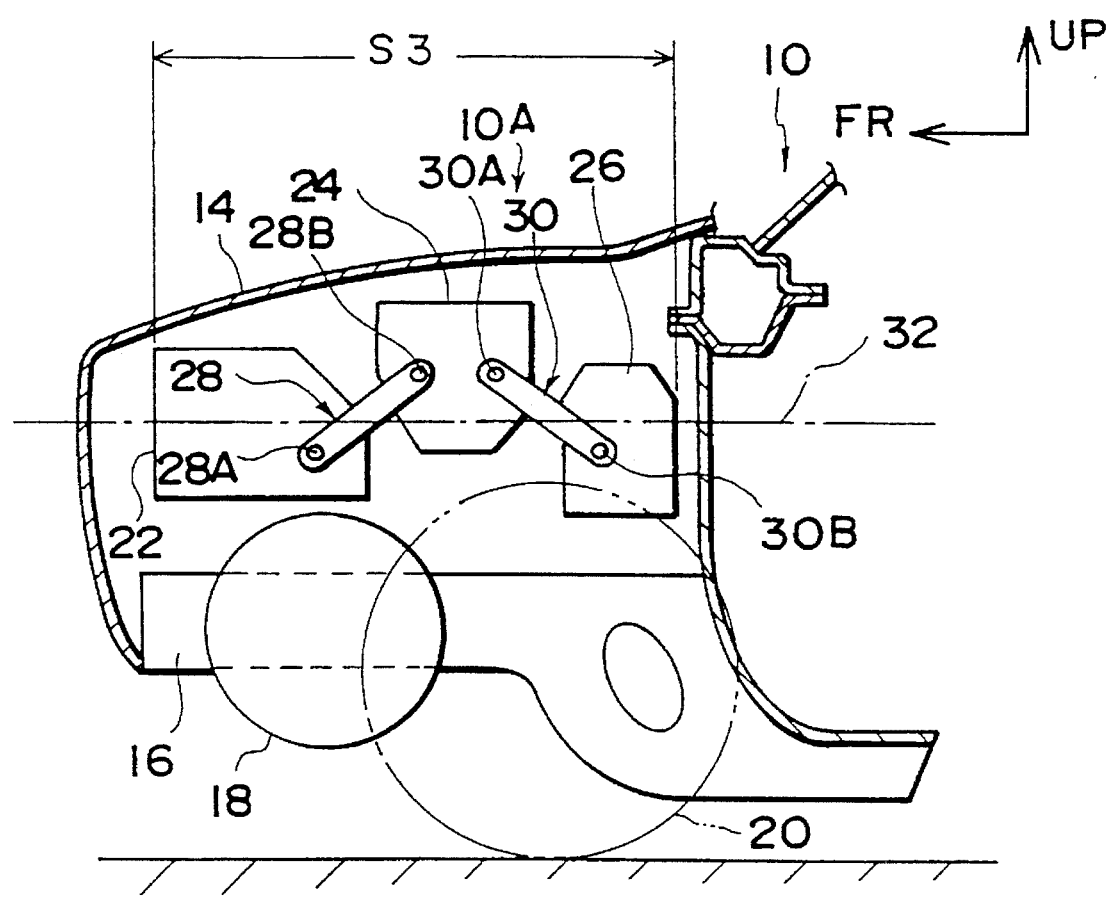
FIG. 1 is a cross-sectional side view illustrating a structure for arranging auxiliary components of an electric vehicle in accordance with a first embodiment of the present invention.
Figure 2:
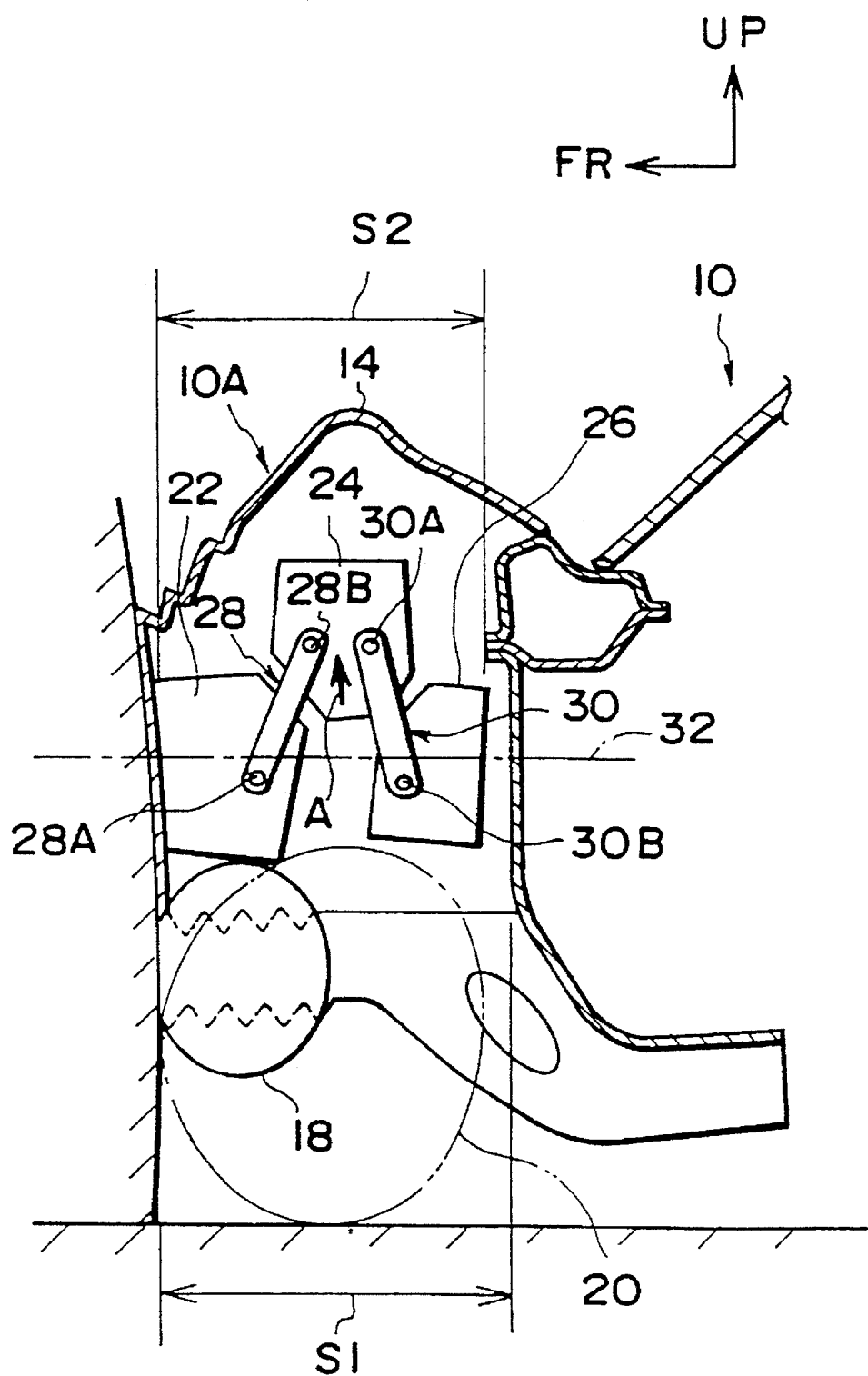
FIG. 2 is a cross-sectional side view illustrating the compression and deformation of the structure for arranging auxiliary components of an electric vehicle in accordance with the first embodiment of the present invention.

Referring first to FIGS. 1 and 2, a description will be given of a first embodiment of a structure for arranging auxiliary components of an electric vehicle in accordance with the present invention. It should be noted that, in the drawings, an arrow FR indicates a forward direction of the vehicle, while an arrow UP indicates an upward direction of the vehicle.

As shown in FIG. 1, a front hood 14 is openably provided at an upper opening within a front body 10A of a vehicle body 10 of an electric vehicle in accordance with this embodiment.

A pair of front side members 16 are arranged in the vicinities of both ends, as viewed in the transverse direction of the vehicle, of a lower portion of the front body 10A in such a manner as to extend in the longitudinal direction of the vehicle. A motor 18 is supported between these front side members 16, and front wheels 20 are driven by this motor 18. On an upper side of the motor 18 in the front body 10A, a plurality of (in this embodiment, three) auxiliary components 22, 24, and 26, such as an inverter, an auxiliary battery, and an inverter for an air-conditioner, are arranged in that order from the front toward the rear of the vehicle body.

These auxiliary components 22, 24, and 26 are respectively coupled to their adjacent auxiliary components by means of links 28 and 30 serving as auxiliary-component moving means. Coupling points 28A, 28B, 30A, and 30B between opposite ends of the links 28 and 30 on the one hand, and the auxiliary components on the other, are arranged at vertically opposite positions with a longitudinal axis 32 of the vehicle placed therebetween.

Next, a description will be given of the operation of this embodiment.

In the structure for arranging auxiliary components of an electric vehicle in accordance with this embodiment, in the event that the front body 10A is compressed and deformed due to an impact load from an object located in front of the vehicle body, as shown in FIG. 2, the overall length of the lower portion of the front body 10A becomes a length S1 which is substantially identical to the length in which the wheels 20 and the motor 18i, which is practically not compressed and deformed at all, overlap. Meanwhile, the auxiliary component 24 moves in an upward direction, i.e., further away from the longitudinal axis 32 of the vehicle (in the direction of arrow A in FIG. 2), due to the operation of the links 28 and 30. Accordingly, since an overall length S2 of the auxiliary components 22, 24, and 26 becomes less than an original overall length S3 of the auxiliary components (see FIG. 1), the amount of the impact load which is transmitted from the object located in front of the vehicle body in the rearward direction of the vehicle body via the auxiliary components 22, 24, and 26 is reduced. Hence, the amount of the impact load applied to the vehicle compartment from the object located in front of the vehicle body is also reduced. In addition, the plurality of auxiliary components 22, 24, and 26, after being moved, are held securely by means of the links 28 and 30.

Referring now to FIGS. 3 to 6, a description will be given of a second embodiment of the structure for arranging auxiliary components of an electric vehicle in accordance with the present invention. It should be noted that the same components as those of the first embodiment will be denoted by the same reference numerals, and description thereof will be omitted.

Figure 6:
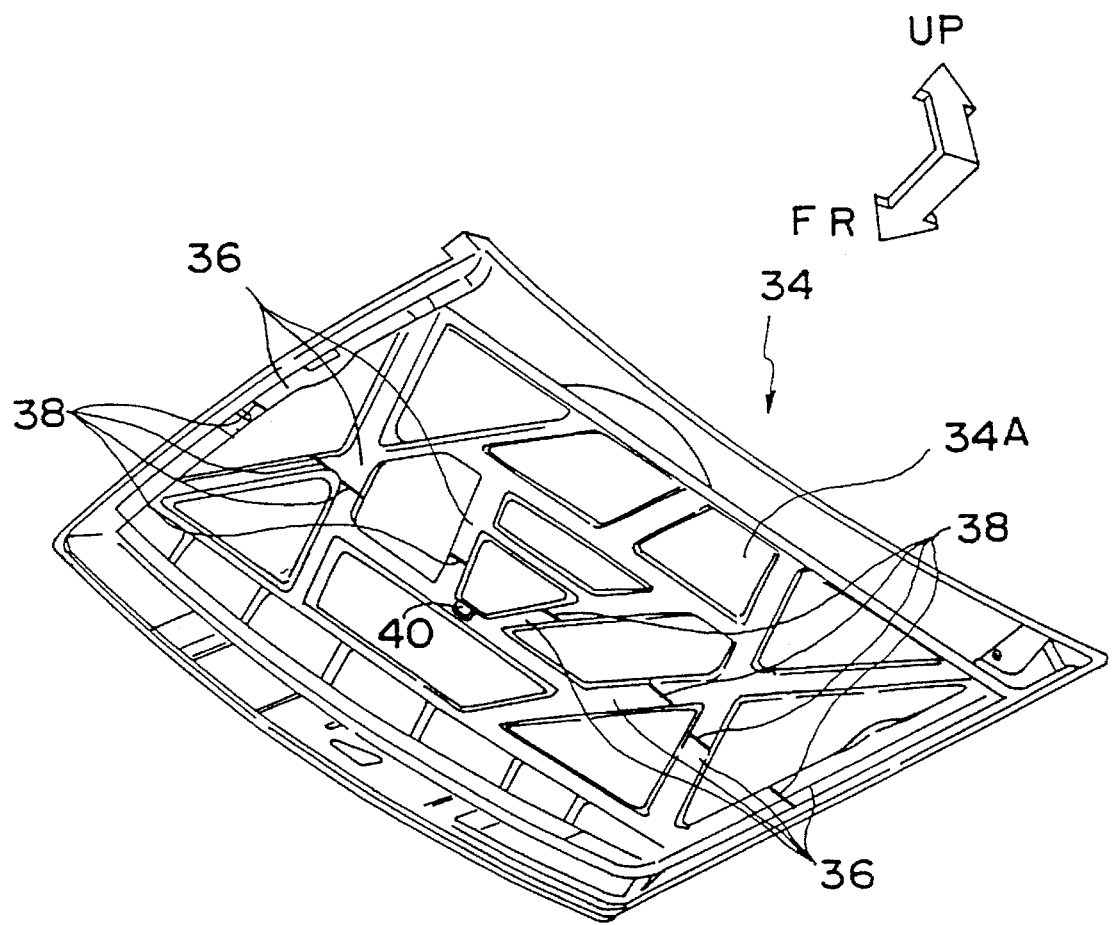
FIG. 6 is a perspective view taken from a diagonally rearward, lower direction of the vehicle, and illustrates a front hood of the structure for arranging auxiliary components of an electric vehicle in accordance with the second embodiment of the present invention.

As shown in FIG. 6, notches 38 are formed along the transverse direction in substantially central portions, as viewed in the longitudinal direction of the vehicle, of a plurality of reinforcing beams 36 which are arranged on a rear surface 34A (an inner surface of the front body 10A) of a front hood 34 in this embodiment.

Figure 4:
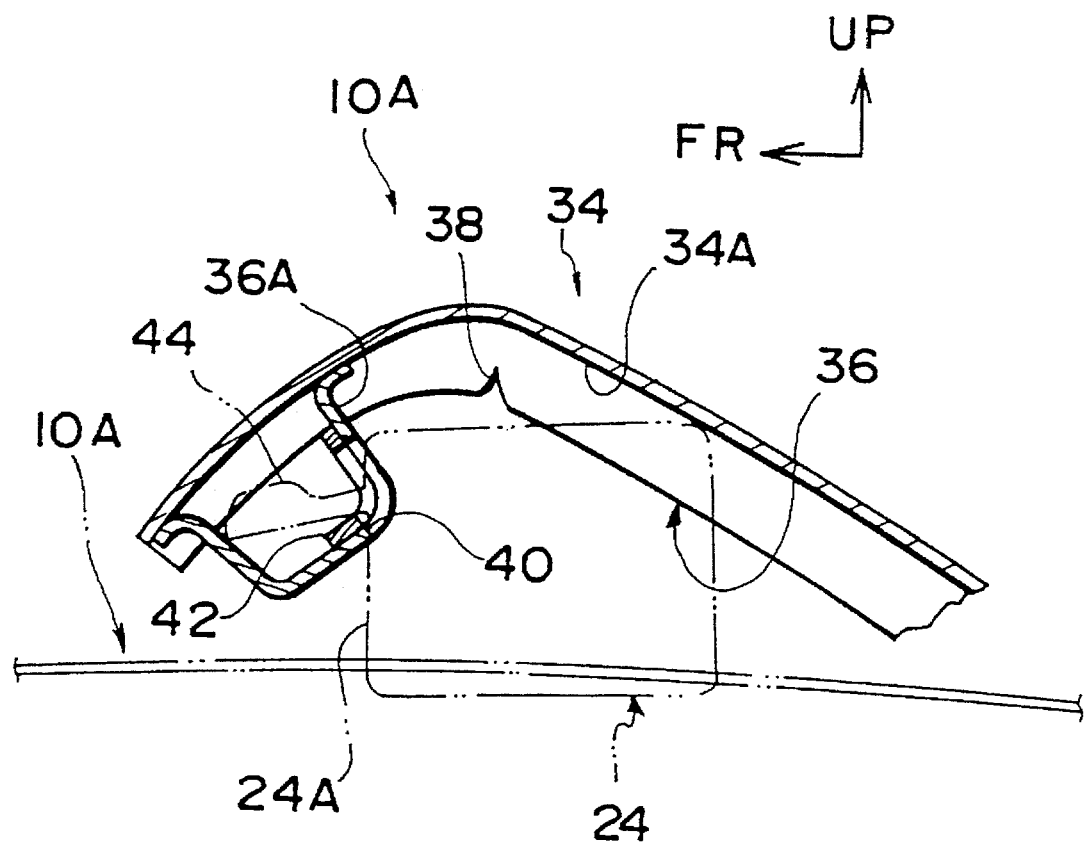
FIG. 4 is a cross-sectional side view illustrating the compression and deformation of the structure for arranging auxiliary components of an electric vehicle in accordance with the second embodiment of the present invention.

In the event that the front body 10A is compressed and deformed in the longitudinal direction of the vehicle, as shown in FIG. 4, the front hood 34 is bent at the position of the notches 38, thereby allowing the central portion, as viewed in the longitudinal direction of the vehicle, of the front hood 34 to project upwardly of the vehicle body as an apex.

Figure 5:
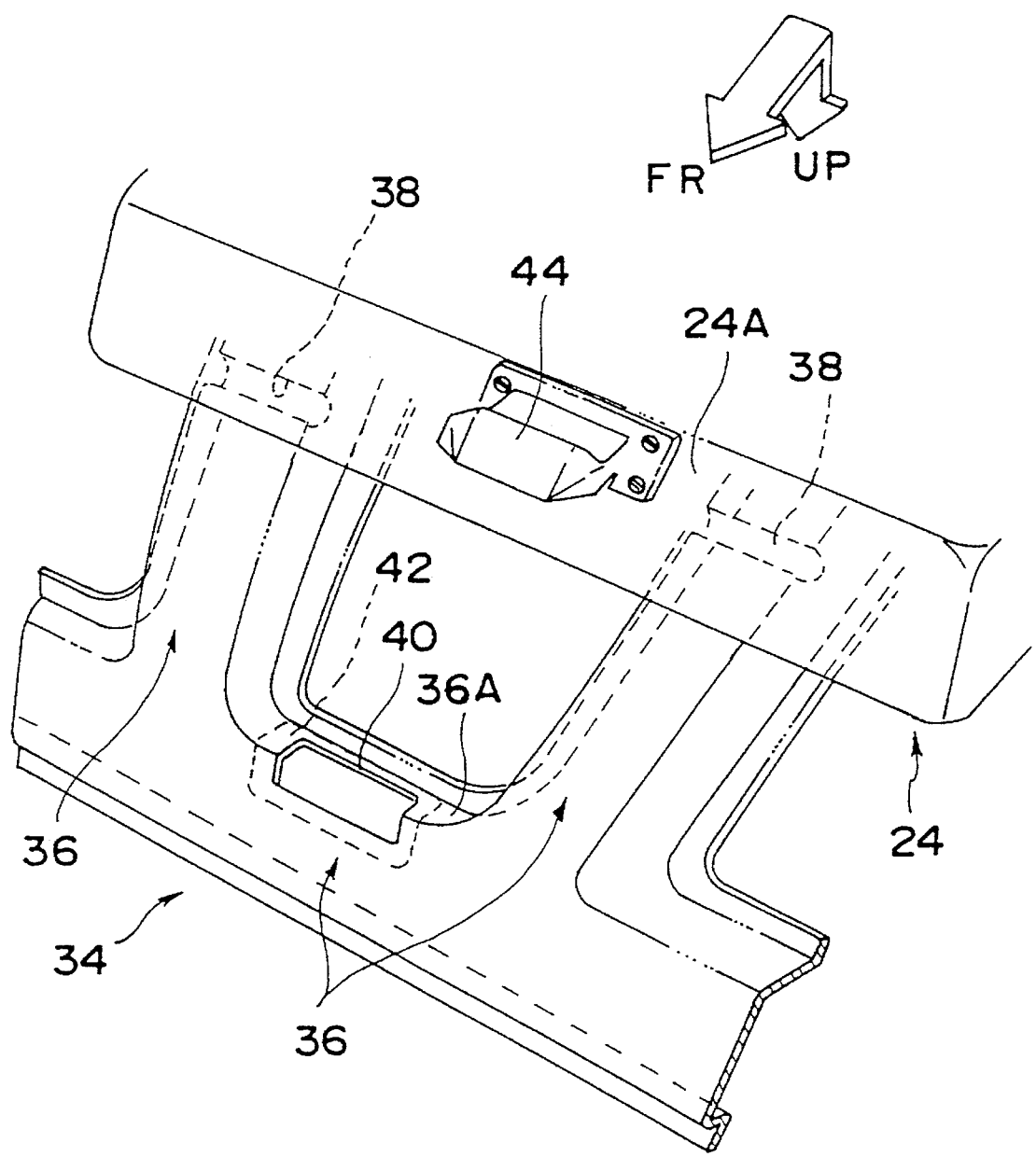
FIG. 5 is a perspective view taken from a diagonally forward, lower direction of the vehicle, and illustrates the structure for arranging auxiliary components of an electric vehicle in accordance with the second embodiment of the present invention.

As shown in FIG. 5, a rectangular notch 40 serving as an engaging portion extending in the transverse direction of the vehicle is formed in a rear side wall 36 of the transversely-extending reinforcing beam 36 of the front hood 34.

Figure 3:
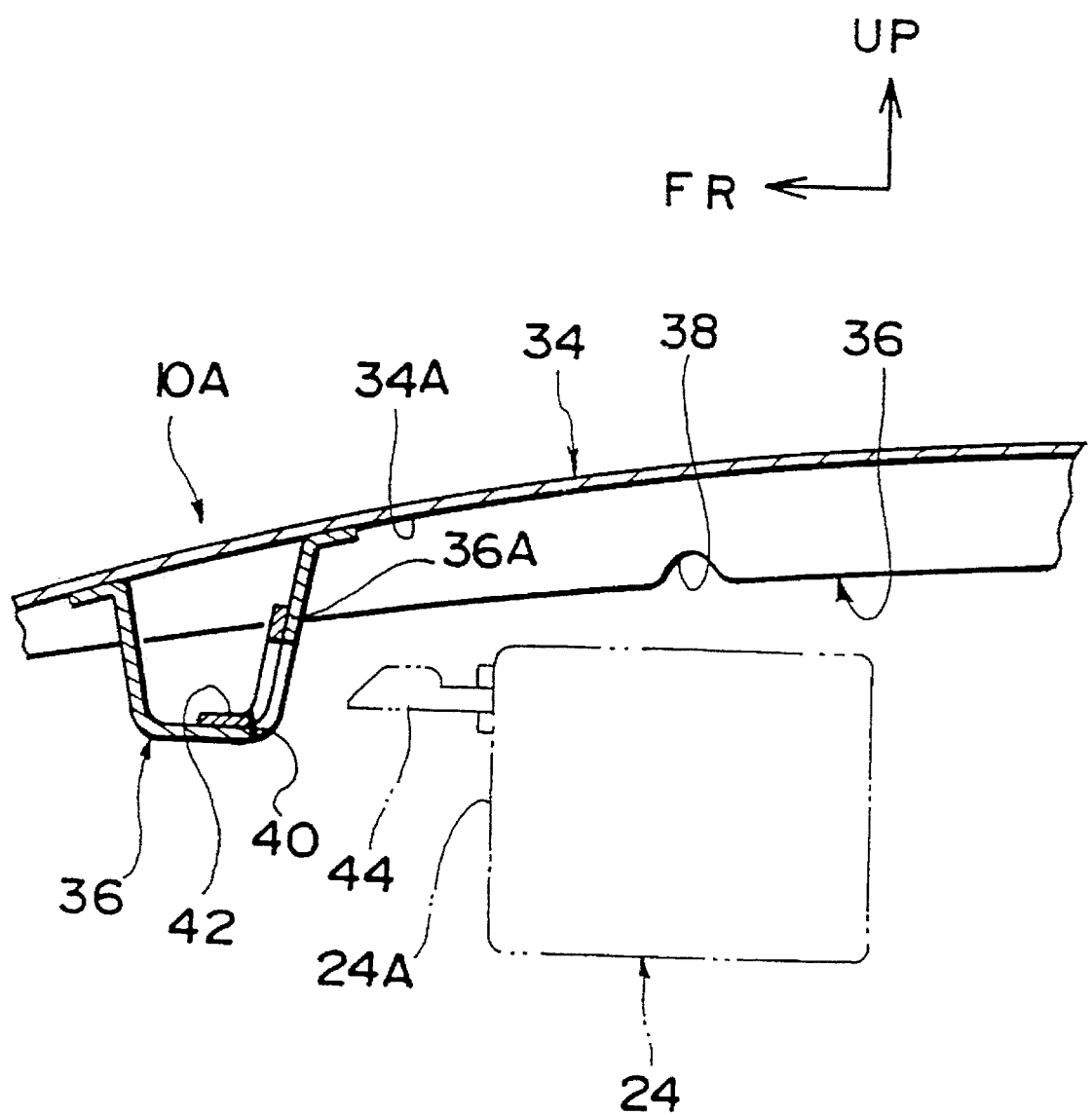
FIG. 3 is a cross-sectional side view illustrating a structure for arranging auxiliary components of an electric vehicle in accordance with a second embodiment of the present invention.

As shown in FIGS. 3, a reinforcing plate is welded onto an inner side of an outer peripheral portion of the notch 40 in the reinforcing beam 36. A pawl 44, which serves as a portion to be engaged and extends in the forward direction of the vehicle, is fixed in the vicinity of an upper end of a front wall 24A of the auxiliary component 24, in face-to-face relation to the notch 40 in the reinforcing beam 36. In the event that the front body 10A is compressed and deformed in the longitudinal direction of the vehicle, as shown in FIG. 4, the pawl 44 is engaged in the notch 40 in the reinforcing beam 36 of the front hood 34, and moves upwardly together with the front hood 34.

Next, a description will be given of the operation of this embodiment.

In the structure for arranging auxiliary components of an electric vehicle in accordance with this embodiment, should the front body 10A be compressed and deformed, the front hood 34 is bent at the position of the notches 38, thereby allowing the central portion, as viewed in the longitudinal direction of the vehicle, of the front hood 34 to project upwardly of the vehicle body as an apex. At this time, the pawl 44 at the front wall 24A of the auxiliary component 24 is engaged in the notch 40 in the reinforcing beam 36 of the front hood 34, and moves upwardly together with the front hood 34. Accordingly, since the overall length of the auxiliary components 22, 24, and 26 becomes less than their original overall length, the amount of the impact load which is transmitted from the object located in front of the vehicle body in the rearward direction of the vehicle body via the auxiliary components is reduced. Hence, the amount of the impact load applied to the vehicle compartment from the object located in front of the vehicle body is also reduced. In addition, the plurality of auxiliary components 24, after being moved, are held securely due to the engagement of the notch 40 and the pawl 44.

Referring now to FIGS. 7 to 11, a description will be given of a third embodiment of the structure for arranging auxiliary components of an electric vehicle in accordance with the present invention. It should be noted that the same components as those of the first embodiment will be denoted by the same reference numerals, and description thereof will be omitted.

Figure 9:
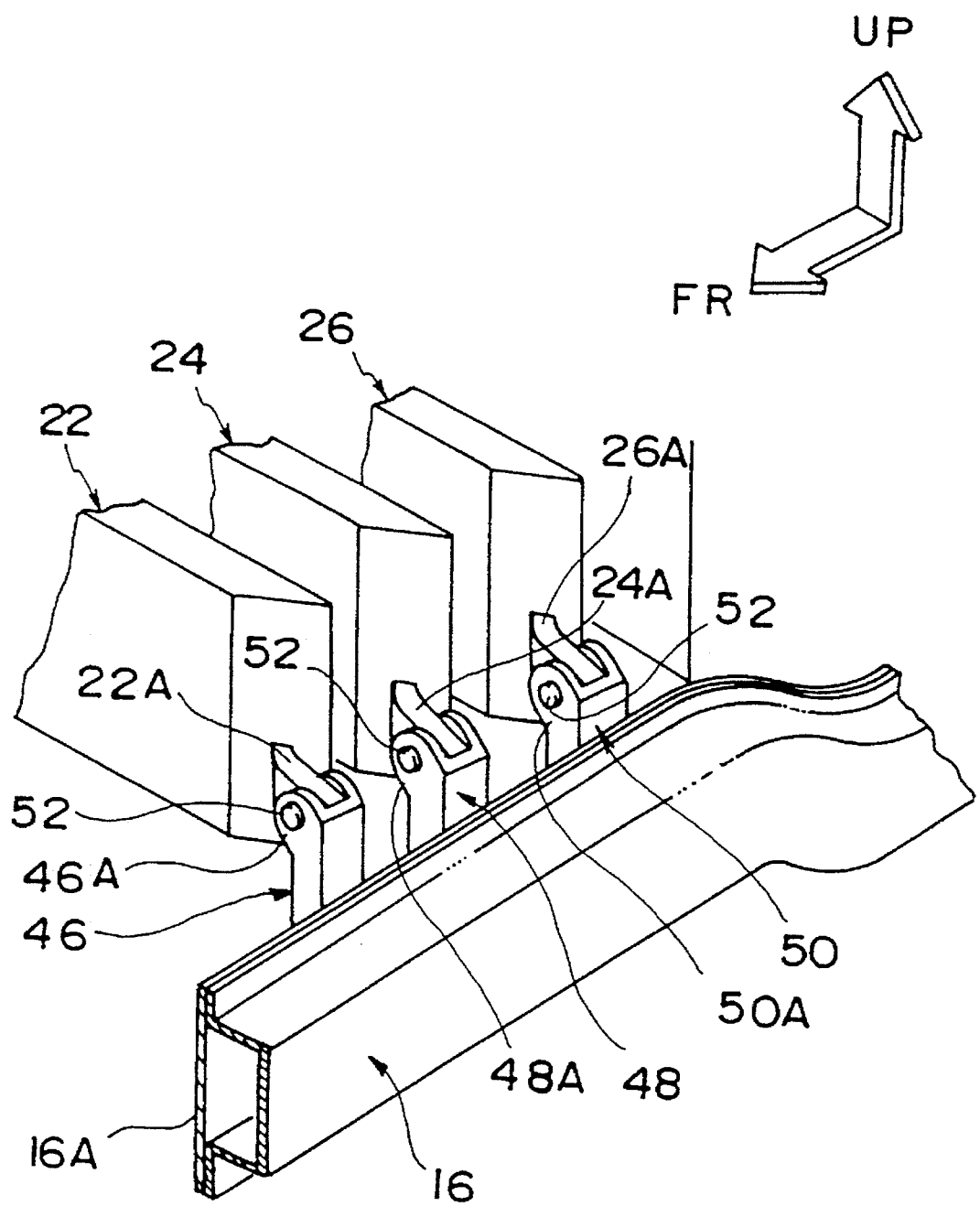
FIG. 9 is a perspective view taken from a diagonally forward, outer direction of the vehicle, and illustrates the structure for arranging auxiliary components of an electric vehicle in accordance with the third embodiment of the present invention.

As shown in FIG. 9, in this embodiment, brackets 46, 48, and 50 for supporting the auxiliary components 22, 24, and 26 are secured to an inward surface 16A, as viewed in the transverse direction of the vehicle, of each of the pair of front side members 16. Mounting portions 46A, 48A, and 50A projecting inwardly in the transverse direction of the vehicle are formed at upper ends of these brackets 46, 48, and 50, respectively. The cross-sectional configuration, as viewed in the vertical direction of the vehicle, of each of these mounting portions 46A, 48A, and 50A is formed in a U-shape with its opening facing the transversely inward side of the vehicle. Mounting projections 22A, 24A, and 26A provided on side surfaces of the auxiliary components 22, 24, and 26 are inserted in the inner sides of the U-shape, and are coupled thereto by means of pins 52, respectively.

Figure 7:
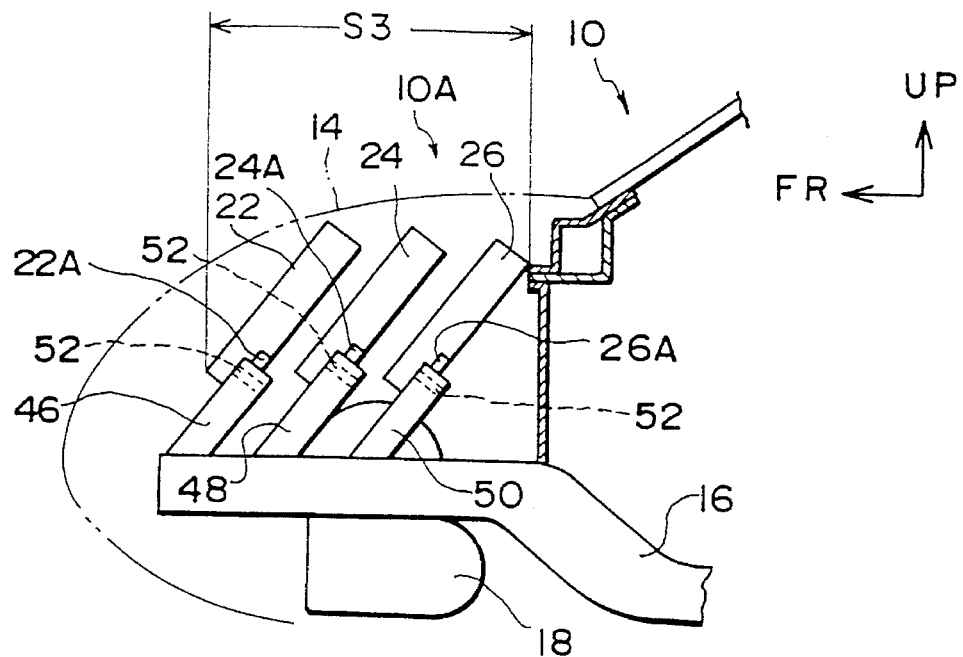
FIG. 7 is a cross-sectional side view illustrating a structure for arranging auxiliary components of an electric vehicle in accordance with a third embodiment of the present invention.

As shown in FIG. 7, the brackets 46, 48, and 50 are respectively secured to the front side members 16 in a state in which the brackets 46, 48, and 50 are inclined from the front lower side of the vehicle toward the rear upper side of the vehicle. Similarly, the auxiliary components 22, 24, and 26 are also inclined from the front lower side of the vehicle toward the rear upper side of the vehicle. The arrangement provided is such that, should the front body 10A be compressed and deformed, as shown in FIG. 8, the front hood 14 is deformed upwardly, and the plurality of auxiliary components 22, 24, and 26 are superposed one on top of the other while rotating to their vertical positions together with the brackets 46, 48, and 50.

Next, a description will be given of the operation of this embodiment.

In the structure for arranging auxiliary components of an electric vehicle in accordance with this embodiment, the height of the front hood 14 can be lowered since the auxiliary components 22, 24, and 26 are mounted on the front side members 16 within the front body 10A along the longitudinal direction of the vehicle by means of the brackets 46, 48, and 50 in a state in which the auxiliary components 22, 24, and 26 are inclined from the front lower side of the vehicle toward the rear upper side of the vehicle.

Figure 8:
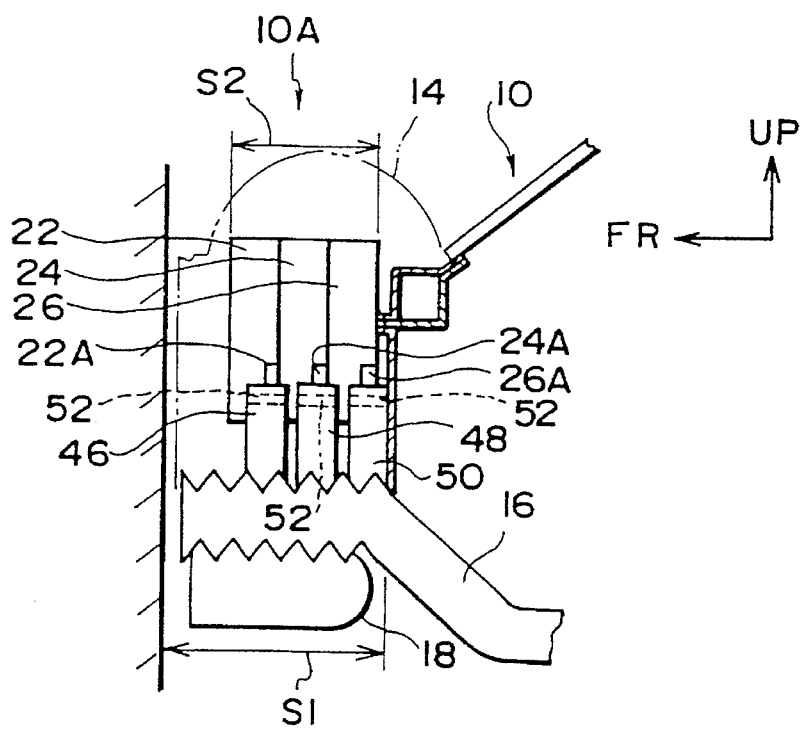
FIG. 8 is a cross-sectional side view illustrating the compression and deformation of the structure for arranging auxiliary components of an electric vehicle in accordance with the third embodiment of the present invention.

In addition, in the event that the front body 10A is compressed and deformed, as shown in FIG. 8, the front hood 14 is deformed upwardly, and the plurality of auxiliary components 22, 24, and 26 are superposed one on top of the other while rotating to their vertical positions together with the brackets 46, 48, and 50. Accordingly, since the overall length S2 of the auxiliary components 22, 24, and 26 becomes less than their original overall length S3 (see FIG. 7), the amount of the impact load which is transmitted from the object located in front of the vehicle body in the rearward direction of the vehicle body via the auxiliary components 22, 24, and 26 is reduced. Hence, the amount of the impact load applied to the vehicle compartment from the object located in front of the vehicle body is also reduced. In addition, the auxiliary components 22, 24, and 26, after being moved, are held securely by means of the brackets 46, 48, and 50.

Figure 10:
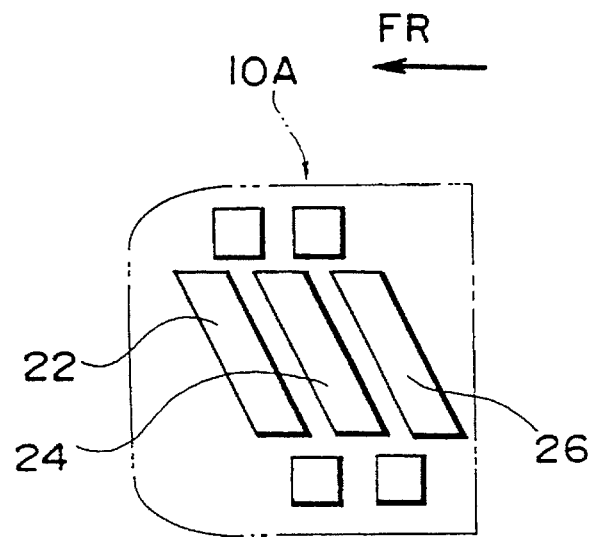
FIG. 10 is a horizontal cross-sectional view illustrating the structure for arranging auxiliary components of an electric vehicle in accordance with a modification of the third embodiment of the present invention.
Figure 11:
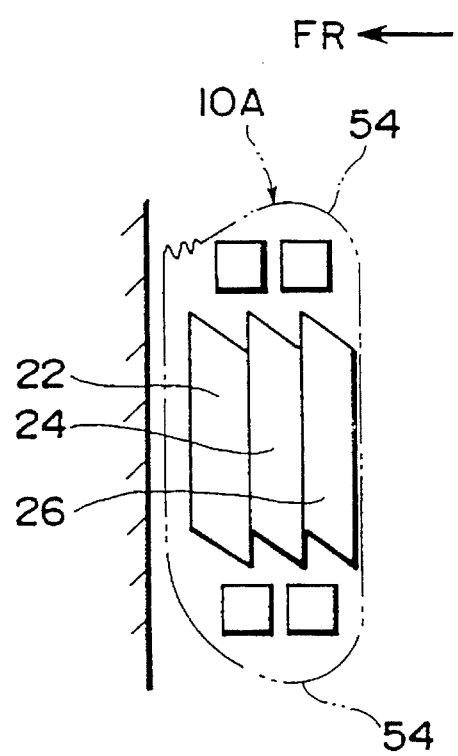
FIG. 11 is a horizontal cross-sectional view illustrating the compression and deformation of the structure for arranging auxiliary components of an electric vehicle in accordance with the modification of the third embodiment of the present invention.

Although, in this embodiment, the auxiliary components 22, 24, and 26 are arranged in a state in which they are inclined from the front lower side of the vehicle toward the rear upper side of the vehicle, the auxiliary components 22, 24, and 26 may be alternatively arranged in a state in which they are inclined from the front right-hand side of the vehicle toward the rear left-hand side of the vehicle as viewed in a plan view (FIG. 10). In this case, when the front body 10A is compressed and deformed, as shown in FIG. 11, a front fender 54 is deformed in the outward direction as viewed in the transverse direction of the vehicle, and the auxiliary components 22, 24, and 26 are superposed one on top of the other while rotating to their positions parallel with the transverse direction of the vehicle.

Figure 12:
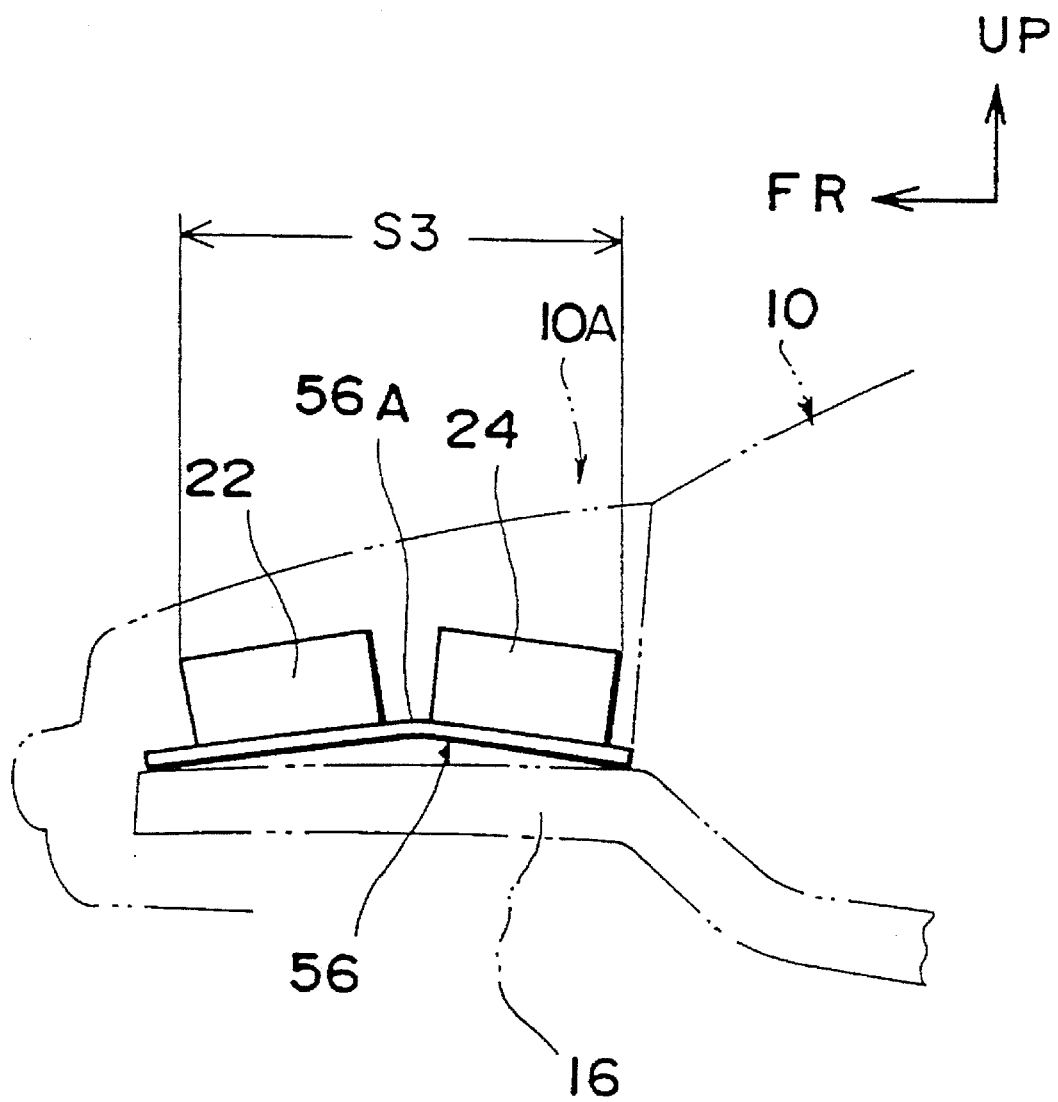
FIG. 12 is a cross-sectional side view illustrating a structure for arranging auxiliary components of an electric vehicle in accordance with a fourth embodiment of the present invention.
Figure 13:
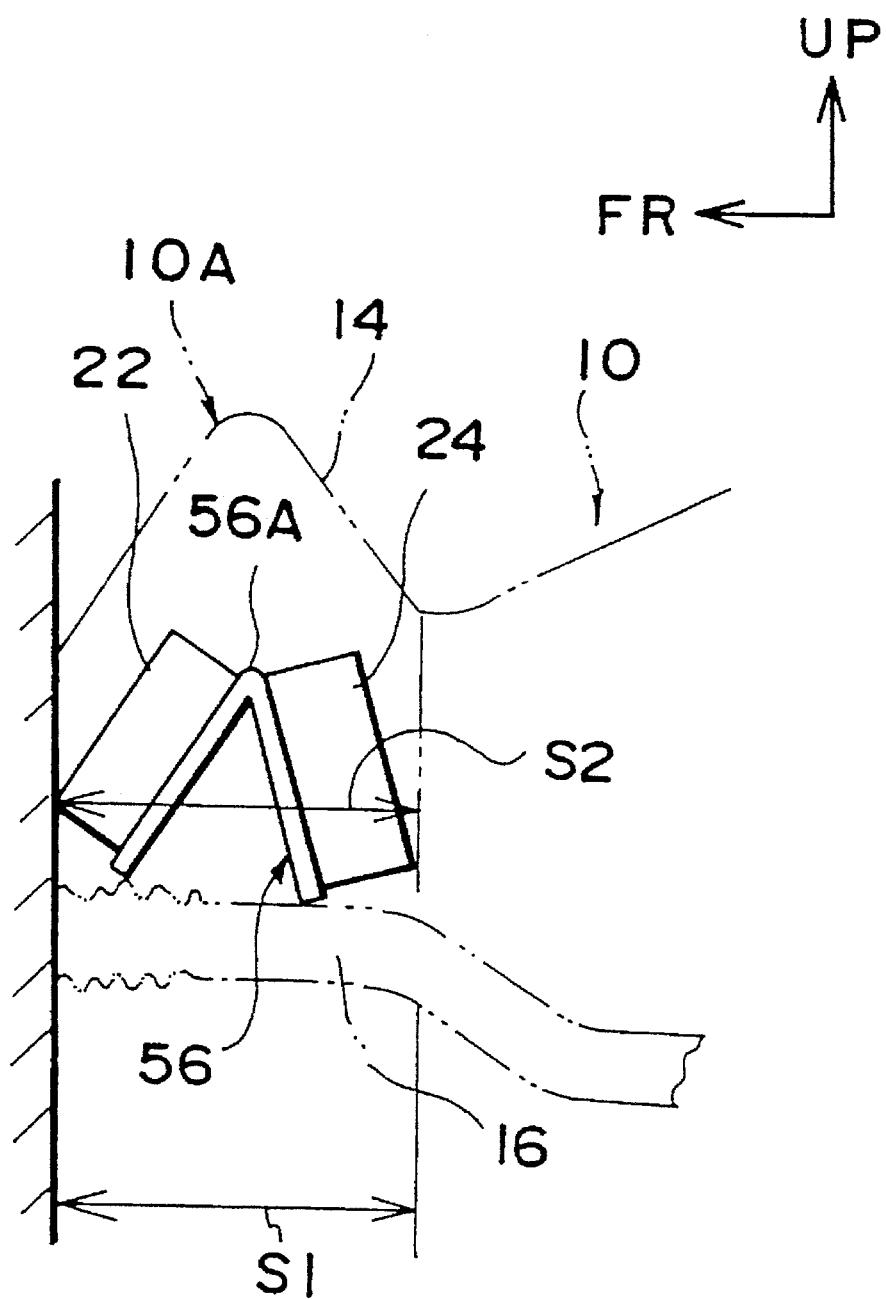
FIG. 13 is a cross-sectional side view illustrating the compression and deformation of the structure for arranging auxiliary components of an electric vehicle in accordance with the fourth embodiment of the present invention.
Figure 14:
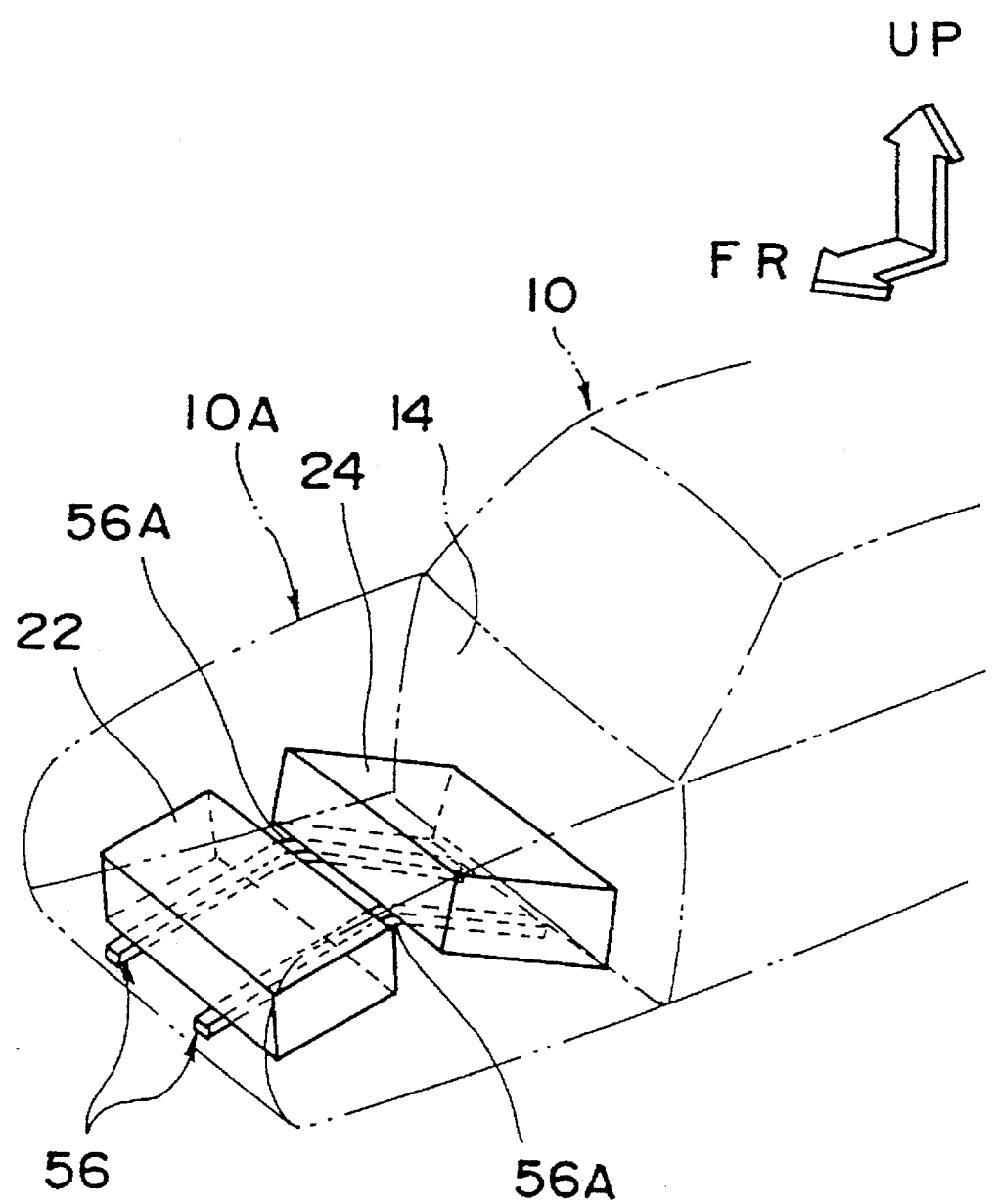
FIG. 14 is a perspective view taken from a diagonally forward direction of the vehicle, and illustrates the structure for arranging auxiliary components of an electric vehicle in accordance with the fourth embodiment of the present invention.

Referring now to FIGS. 12 to 14, a description will be given of a fourth embodiment of the structure for arranging auxiliary components of an electric vehicle in accordance with the present invention. It should be noted that the same components as those of the first embodiment will be denoted by the same reference numerals, and description thereof will be omitted.

As shown in FIG. 14, in this embodiment, a pair of support bars 56, which serve as bending-mode members extending in the longitudinal direction of the vehicle in parallel with each other, are arranged within the front body 10A. The auxiliary component 22 is mounted on upper portions of these support bars 56 on the front side thereof, while the auxiliary component 24 is mounted on the upper portions of the support bars 56 on the rear side thereof.

As shown in FIG. 12, a substantially central portion, as viewed in the longitudinal direction of the vehicle, of each of the support bars 56 is formed as a bent portion 56A projecting upwardly of the vehicle body. When the front body 10A is compressed and deformed, as shown in FIG. 13, the support bars 56 are folded in two with the respective bent portions 56A serving as bending points.

Next, a description will be given of the operation of this embodiment.

In the structure for arranging auxiliary components of an electric vehicle in accordance with this embodiment, when the front body 10A is compressed and deformed, as shown in FIG. 13, the support bars 56 with the auxiliary components 22 and 24 mounted thereon are folded in two with the respective bent portions 56A serving as bending points. Consequently, the direction in which the auxiliary components 22 and 24 are arranged is bent along the support bars 56. Accordingly, since the overall length S2 of the auxiliary components 22 and 24 becomes less than their original overall length S3 (see FIG. 12), the amount of the impact load which is transmitted from the object located in front of the vehicle body in the rearward direction of the vehicle body via the auxiliary components 22 and 24 is reduced. Hence, the amount of the impact load applied to the vehicle compartment from the object located in front of the vehicle body is also reduced. In addition, the plurality of auxiliary components 24 and 26, after being moved, are held securely by the support bars 56.

Figure 15:
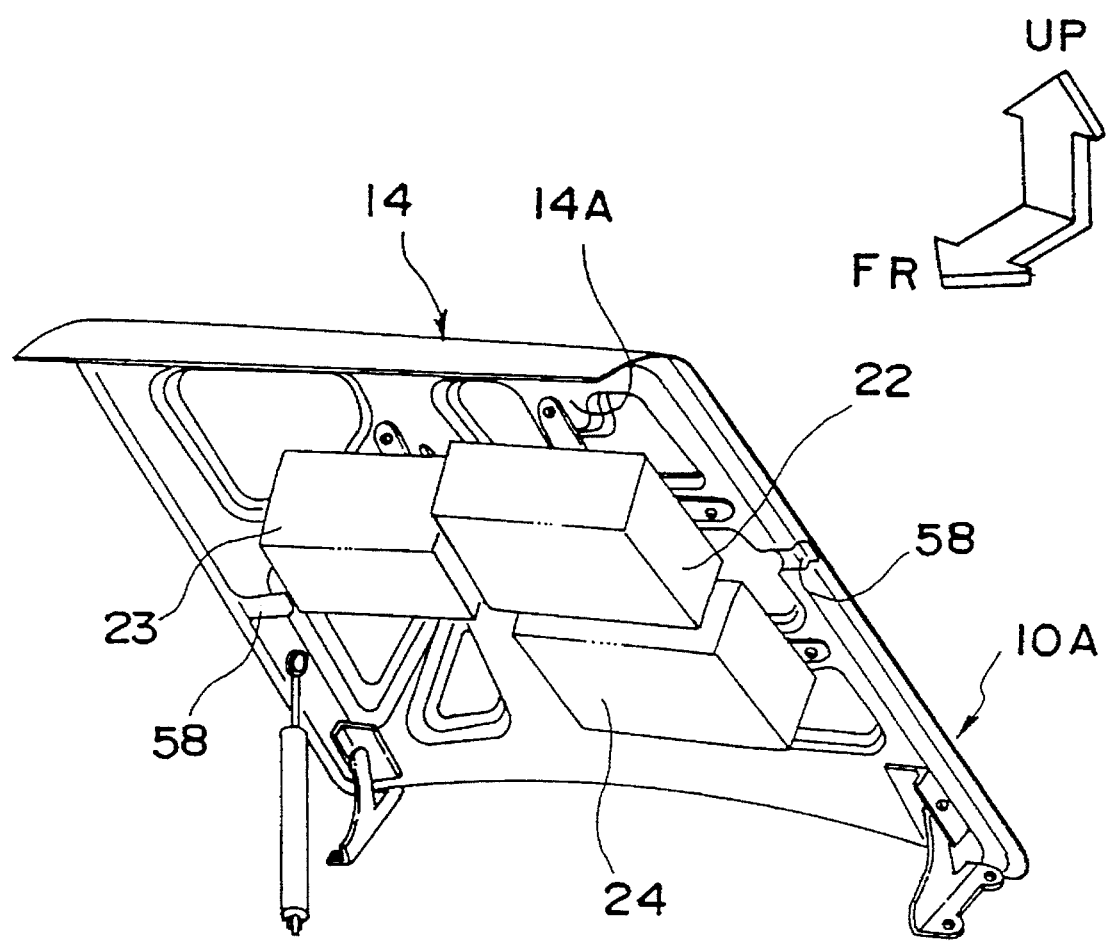
FIG. 15 is a perspective view taken from the diagonally forward direction of the vehicle, and illustrates the structure for arranging auxiliary components of an electric vehicle in accordance with a modification of the forth embodiment of the present invention.

Although, in this embodiment, the auxiliary components 22 and 24 are supported by the support bars 56 serving as the bending-mode members, an arrangement may be alternatively provided as shown in FIG. 15. Namely, notches 58 are provided in a substantially central portion, as viewed in the longitudinal direction of the vehicle, of the front hood 14. By using the front hood 14 as the bending-mode member, the auxiliary components 22 and 23 are fixed to the rear surface 14A of this front hood 14 at a position that is forward of the notches 58, while the auxiliary component 24 is fixed to the rear surface 14A at a position that is rearward of the notches 58.

Figure 16:
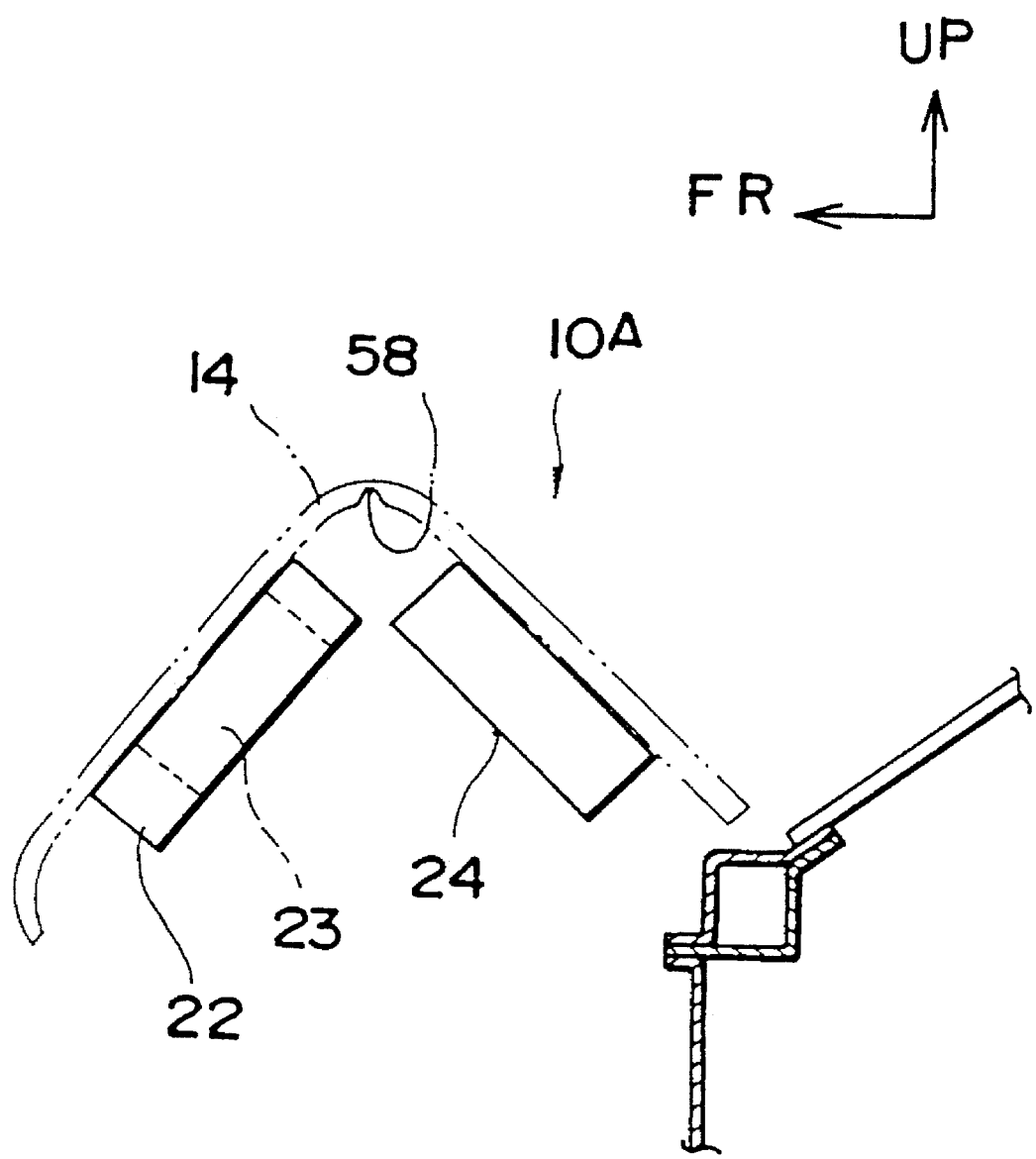
FIG. 16 is a cross-sectional side view illustrating the compression and deformation of the structure for arranging auxiliary components of an electric vehicle in accordance with the modification of the fourth embodiment of the present invention.

In this modification, when the front body is compressed and deformed, as shown in FIG. 16, the front hood 14 with the auxiliary components 22, 23, and 24 fixed thereto is folded in two with the notches 58 serving as bending points. Consequently, the direction in which the auxiliary components 22, 23, and 24 are arranged is bent along the front hood 14. Accordingly, since the overall length of the auxiliary components 22, 23, and 24 becomes less than their original overall length, the amount of the impact load which is transmitted from the object located in front of the vehicle body in the rearward direction of the vehicle body via the auxiliary components 22, 23, and 24 is reduced. Hence, the amount of the impact load applied to the vehicle compartment from the object located in front of the vehicle body is also reduced. In addition, the plurality of auxiliary components 22, 23, and 24, after being moved, are held securely by the front hood 14.

Referring now to FIGS. 17 to 20, a description will be given of a fifth embodiment of the structure for arranging auxiliary components of an electric vehicle in accordance with the present invention. It should be noted that the same components as those of the first embodiment will be denoted by the same reference numerals, and description thereof will be omitted.

Figure 17:
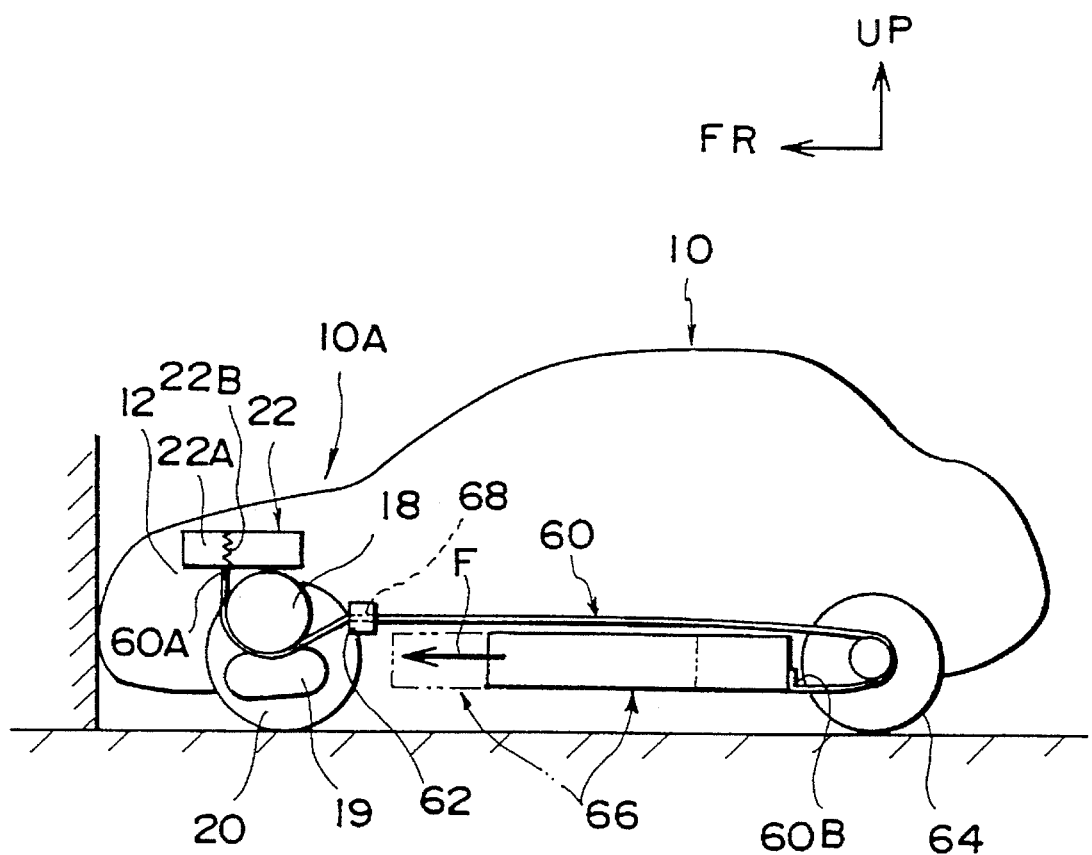
FIG. 17 is a cross-sectional side view illustrating a structure for arranging auxiliary components of an electric vehicle in accordance with a fifth embodiment of the present invention.

As shown in FIG. 17, in this embodiment, the auxiliary component 22 extends in the longitudinal direction of the vehicle, and a front end portion 22A thereof projects forwardly of the motor 18 and the front wheels 20. A breaking portion 22B is formed at a substantially central portion, as viewed in the longitudinal direction of the vehicle, of this auxiliary component 22. The arrangement provided is such that when a load has acted on this breaking portion 22B in a downward direction, the auxiliary component 22 is easily broken at its intermediate portion.

One end 60A of a belt is fixed at a lower portion of the breaking portion 22B of the auxiliary component 22. This belt 60 is passed between the motor 18 and a reduction gear 19, is then passed through a floor cross-member 62, and is folded back at an intermediate position between rear wheels 64. The other end 60B of the belt 60 is secured to a battery carrier 66. The battery carrier 66 is mounted on the underside of the vehicle body 10, and is adapted to be cut off from the vehicle body 10 during a sudden deceleration of the vehicle so as to be movable in the forward direction of the vehicle (in the direction of arrow F in FIG. 17).

Figure 19:
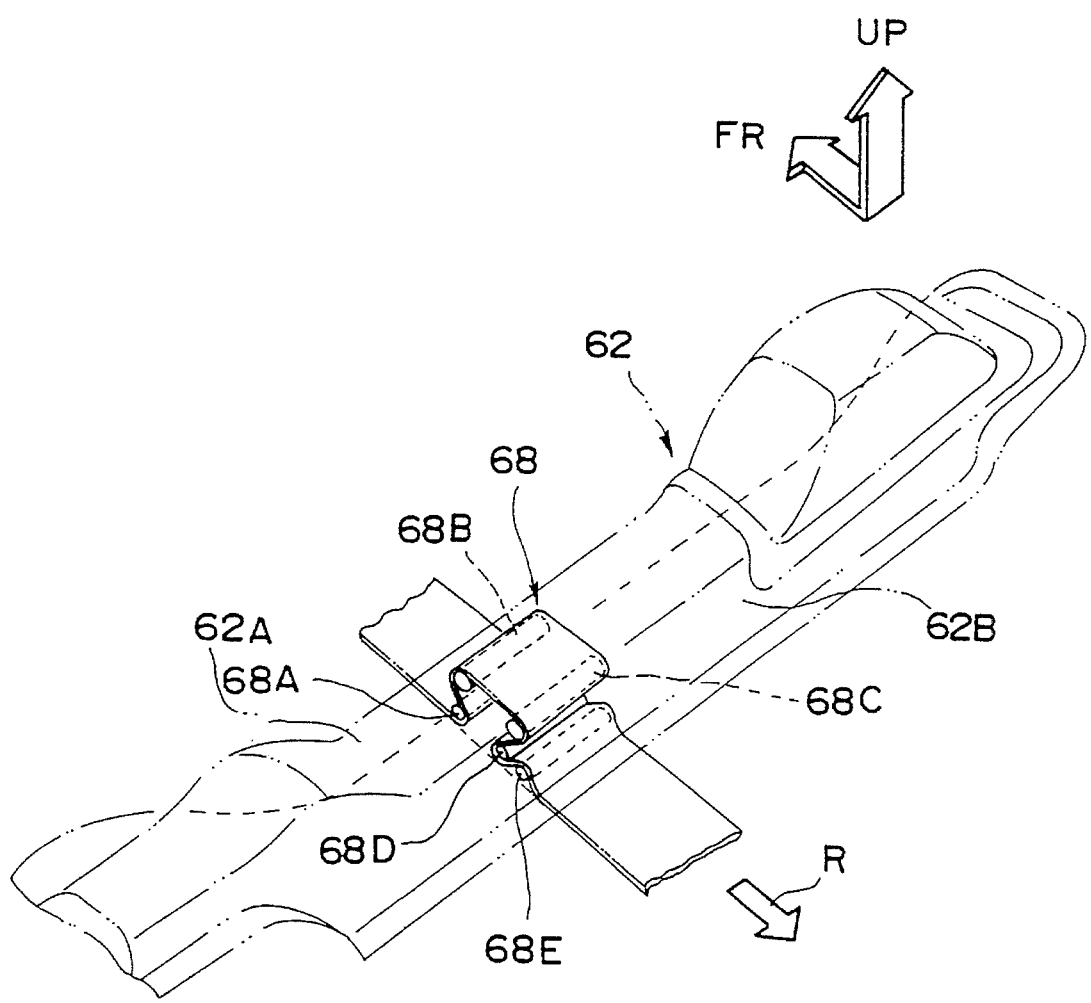
FIG. 19 is a perspective view taken from a diagonally rearward direction of the Vehicle, and illustrates a tightening portion of the structure for arranging auxiliary components of an electric vehicle in accordance with the fourth embodiment of the present invention.

As shown in FIG. 19, a belt-tightening unit 68 is provided in the floor cross-member 62. This belt-tightening unit 68 is comprised of five tightening rollers 68A, 68B, 68C, 68D, and 68E which are arranged with their axes extending in the transverse direction of the vehicle. The tightening rollers 68A and 68B are arranged at vertically upper and lower positions along a front wall 62A of the floor cross-member 62, while the rollers 68C, 68D, and 68E are arranged in a zigzag manner along a rear wall 62B of the floor cross-member 62.

The belt 60 is wound around these tightening rollers 68A, 68B, 68C, 68D, and 68E, and is so arranged that it does not easily return in the opposite direction once the belt 60 is moved in the rearward direction of the vehicle (in the direction of arrow R in FIG. 19).

Next, a description will be given of the operation of this embodiment.

Figure 18:
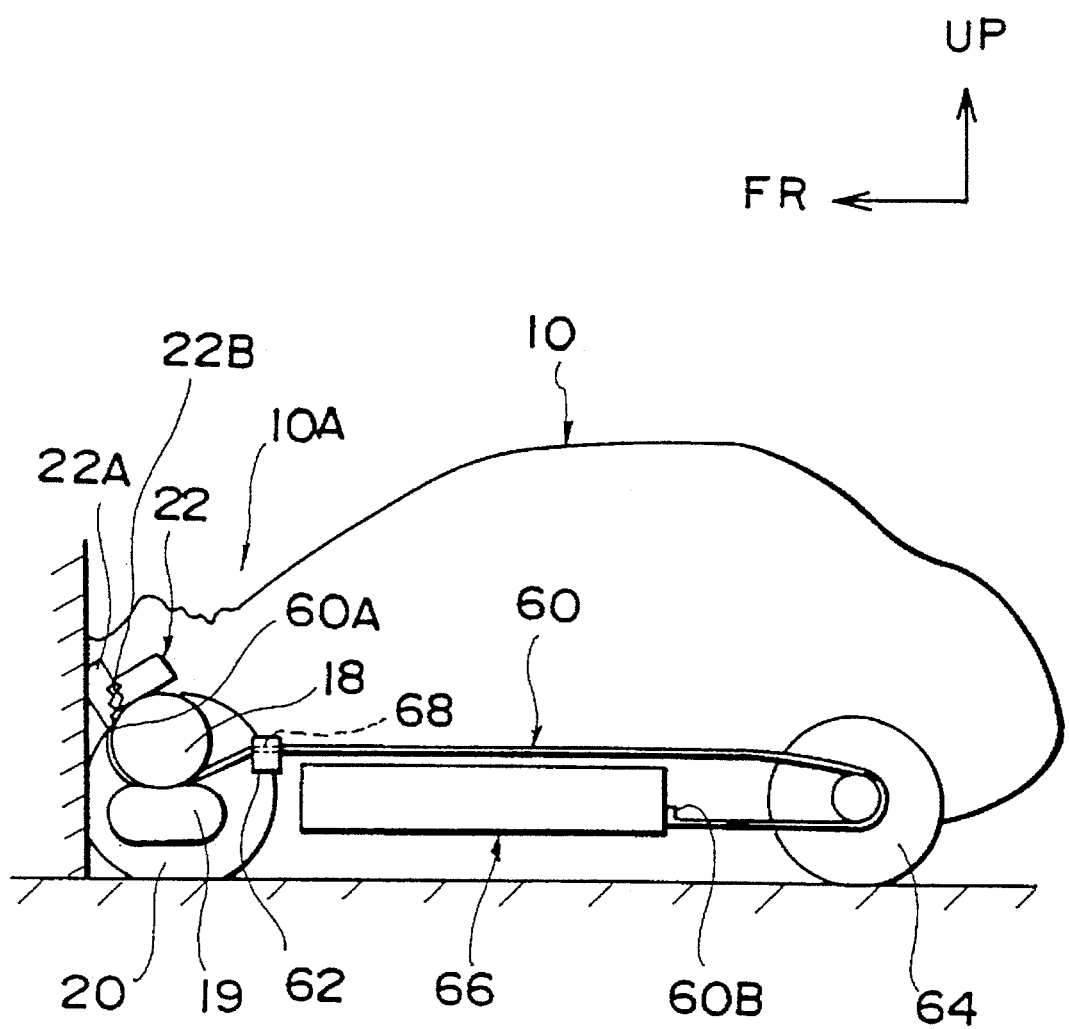
FIG. 18 is a cross-sectional side view illustrating the compression and deformation of the structure for arranging auxiliary components of an electric vehicle in accordance with the fifth embodiment of the present invention.

In the structure for arranging auxiliary components of an electric vehicle in accordance with this embodiment, during a sudden deceleration of the vehicle, as shown in FIG. 18, the battery carrier 66 fixed to the underside of the vehicle body 10 is cut off from the vehicle body 10 and moves in the forward direction of the vehicle. As a result, the belt 60 is pulled by the battery carrier 66, and a downwardly-acting load is applied to the breaking portion 22B of the auxiliary component 22 connected to the belt 60, thereby causing the auxiliary component 22 to be bent downwardly at its intermediate portion. Accordingly, since the overall length of the auxiliary component 22 becomes less than its original overall Length, the amount of the impact load which is transmitted from the object located in front of the vehicle body in the rearward direction of the vehicle body via the auxiliary component 22 is reduced. Hence, the amount of the impact load applied to the vehicle compartment from the object located in front of the vehicle body is also reduced.

In addition, once the end 60A of the belt 60 is pulled downwardly, it does not easily return upwardly by virtue of the action of the belt-tightening unit 68, so that the auxiliary component 22 remains bent at its intermediate portion.

Figure 20:
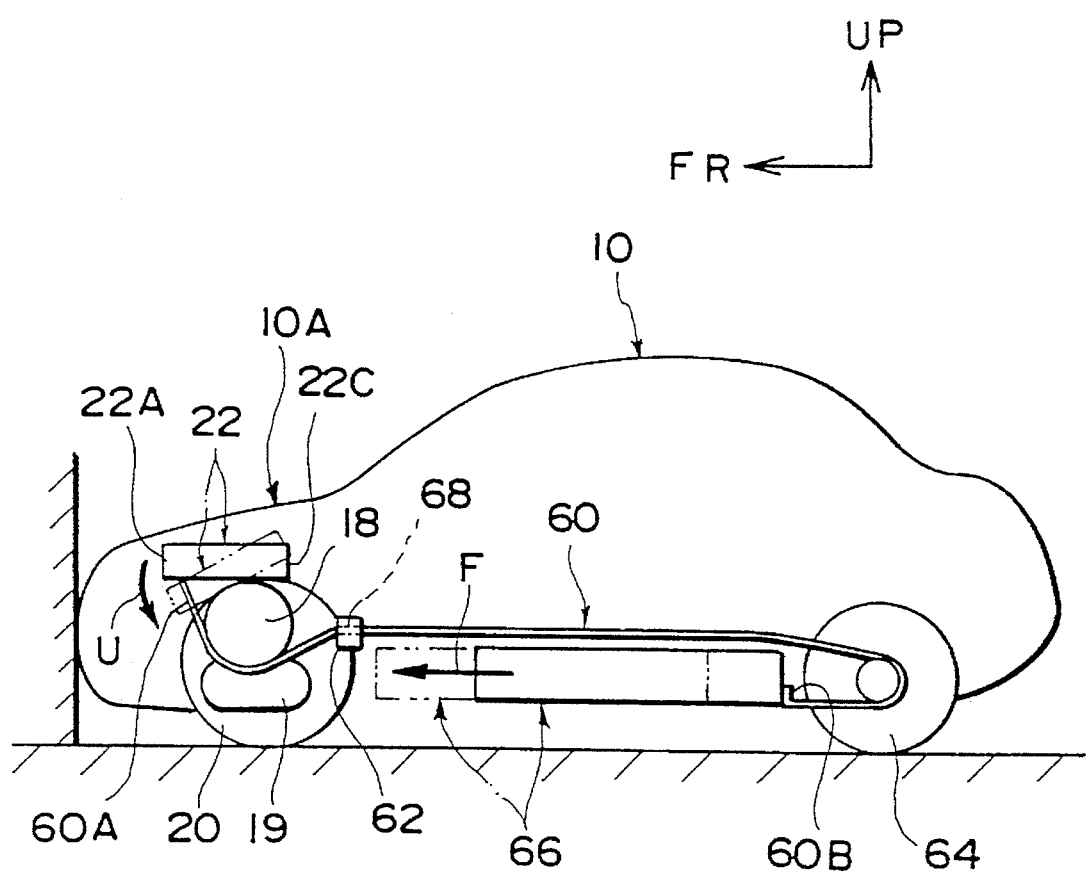
FIG. 20 is a cross-sectional side view illustrating the structure for arranging auxiliary components of an electric vehicle in accordance with a modification of a fifth embodiment of the present invention.
Figure 21:
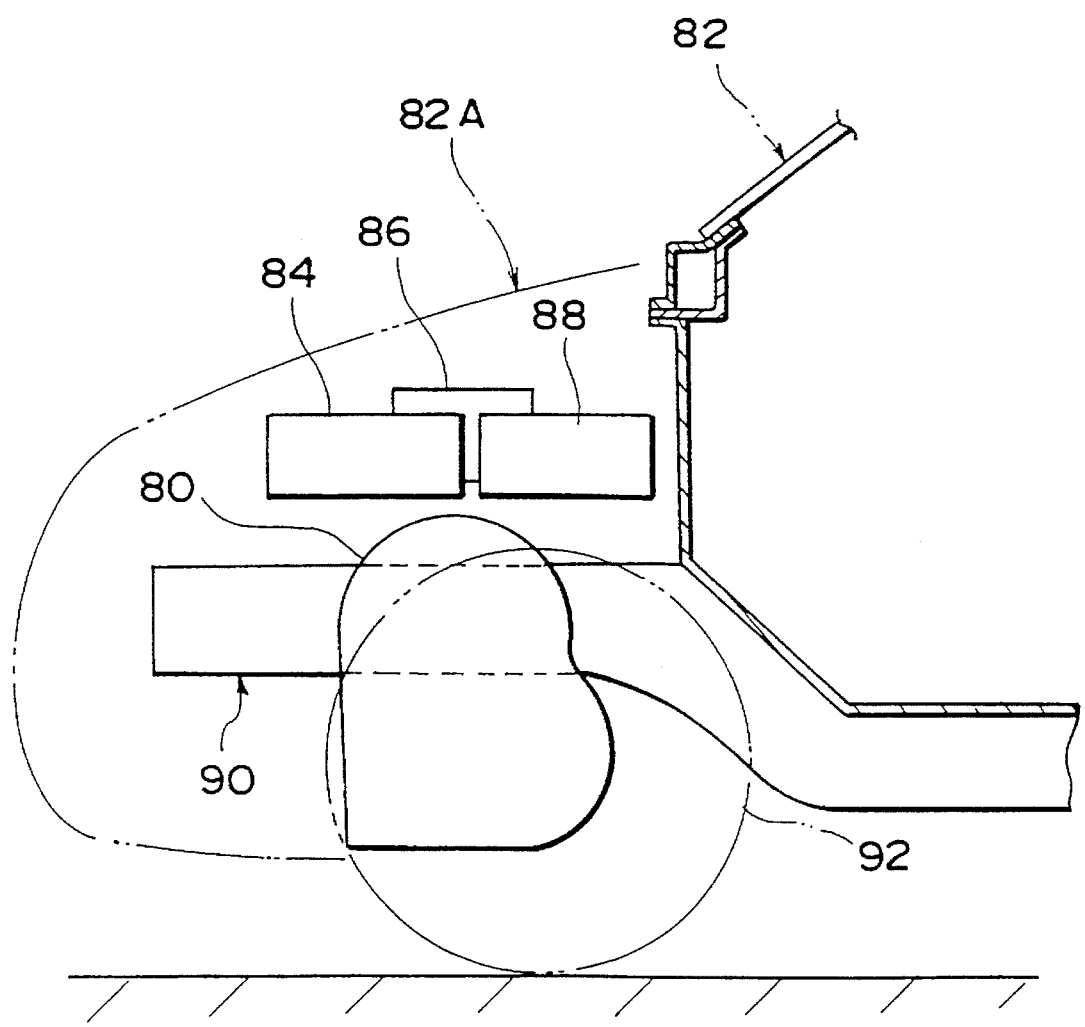
FIG. 21 is a cross-sectional side view illustrating a conventional structure for arranging auxiliary components of an electric vehicle.
Figure 22:
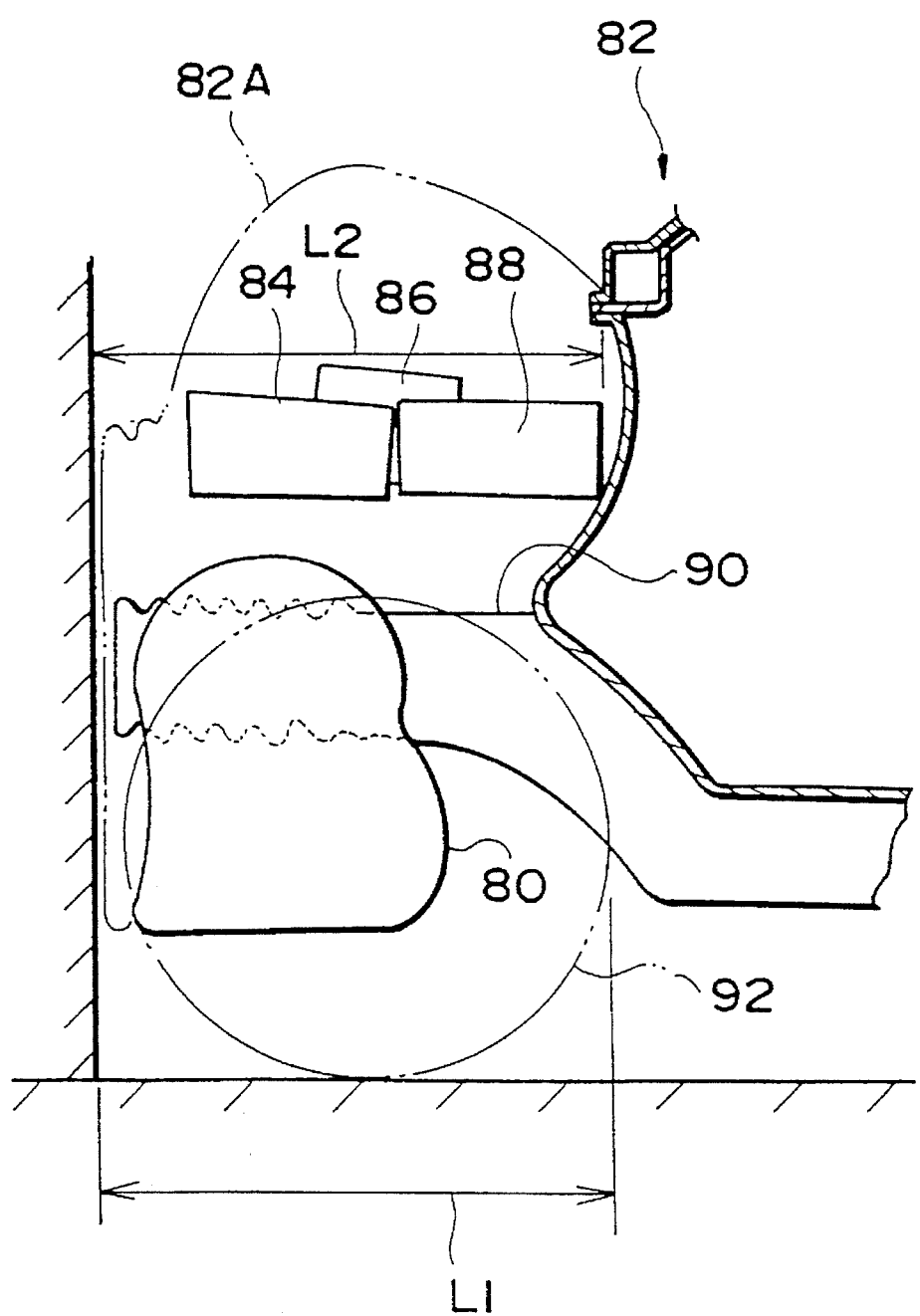
FIG. 22 is a cross-sectional side view illustrating the compression and deformation of the conventional structure for arranging auxiliary components of an electric vehicle.

In this embodiment, the breaking portion 22B is formed at the substantially central portion, as viewed in the longitudinal direction of the vehicle, of this auxiliary component 22, and the auxiliary component 22 is adapted to be easily broken at its intermediate portion when a load has acted on the breaking portion 22B in the downward direction. However, an arrangement may be alternatively provided as shown in FIG. 20. Namely, the auxiliary component 22 is pivotally supported on the vehicle body such that the front portion 22A is swingable in the downward direction (in the direction of arrow U in FIG. 20) with a rear portion 22C serving as a fulcrum. Further, one end 60A of the belt 60 is fixed to the front portion 22A. In this case, when the belt 60 is pulled, the front portion 22A of the auxiliary component 22 is swung downwardly, and the longitudinal length of the auxiliary component 22 becomes less than its original overall length.

It should be noted that, in the first to fifth embodiments, insofar as the overall length of the auxiliary components after compression is less than the overall length of the lower portion of the front body 10A after compression, the impact load from an object located in front of the vehicle is prevented from being transmitted in the rearward direction of the vehicle via the auxiliary components.

What is claimed is:

1. A structure for arranging an auxiliary component of an electric vehicle, comprising:

an auxiliary component disposed in a front body of said electric vehicle; and auxiliary-component moving means for vertically moving at least a portion of said auxiliary component such that an overall length of said auxiliary component in a longitudinal direction of said vehicle becomes less than an original overall length of said auxiliary component in a case where said front body is compressed and deformed.

2. A structure for arranging an auxiliary component of an electric vehicle according to claim 1, wherein in the case where said front body is compressed and deformed, said auxiliary-component moving means moves said auxiliary component such that the overall length of said auxiliary component in the longitudinal direction of said vehicle becomes less than an overall longitudinal length of said front body existing after said front body is compressed and deformed.

3. A structure for arranging an auxiliary component of an electric vehicle according to claim 1, wherein said auxiliary-component moving means comprises links, and a plurality of auxiliary components are coupled to each other by means of said links, coupling points at opposite ends of said links being arranged on both sides of a longitudinal axis of said vehicle.

4. A structure for arranging an auxiliary component of an electric vehicle according to claim 3, wherein said links are arranged to move portions of said plurality of auxiliary components upwardly when said front body is compressed and deformed.

5. A structure for arranging an auxiliary component of an electric vehicle according to claim 1, wherein said auxiliary-component moving means comprises a front hood which moves upwardly when said front body is compressed and deformed, an engaging portion provided in said front hood, and a portion to be engaged which is provided in at least one of said plurality of auxiliary components and engages said engaging portion when said front body is compressed and deformed.

6. A structure for arranging an auxiliary component of an electric vehicle according to claim 5, wherein a notch is formed in a substantially central portion, as viewed in the longitudinal direction of said vehicle, of a rear surface of said front hood in such a manner as to extend in a transverse direction of said vehicle.

7. A structure for arranging an auxiliary component of an electric vehicle according to claim 1, wherein said auxiliary-component moving means comprises brackets for mounting a plurality of auxiliary components in said front body along the longitudinal direction of said vehicle in a state in which said plurality of auxiliary components are inclined.

8. A structure for arranging an auxiliary component of an electric vehicle according to claim 7, wherein said brackets serve to mount said plurality of auxiliary components in a state in which said auxiliary components are inclined by using a vertical axis as a reference.

9. A structure for arranging an auxiliary component of an electric vehicle according to claim 7, wherein said brackets serve to mount said plurality of auxiliary components in a state in which said auxiliary components are inclined by using as a reference an axis extending in a transverse direction of said vehicle.

10. A structure for arranging an auxiliary component of an electric vehicle according to claim 1, wherein said auxiliary-component moving means comprises a bending-mode member on which a plurality of auxiliary components are mounted and which is adapted to be bent when said front body is compressed and deformed.

11. A structure for arranging an auxiliary component of an electric vehicle according to claim 10, wherein said bending-mode member comprises a support bar for supporting said plurality of auxiliary components.

12. A structure for arranging an auxiliary component of an electric vehicle according to claim 11, wherein said support bar has a bending portion which projects toward an upper side of said vehicle, and said support bar is bent with said bending portion serving as a bending point when said front body is compressed and deformed.

13. A structure for arranging an auxiliary component of an electric vehicle according to claim 10, wherein said bending-mode member comprises a front hood.

14. A structure for arranging an auxiliary component of an electric vehicle according to claim 13, wherein said front hood has a notch formed in a substantially central portion thereof in the longitudinal direction of said vehicle, and said front hood is bent with said notch serving as a bending point when said front body is compressed and deformed.

15. A structure for arranging an auxiliary component of an electric vehicle according to claim 1, wherein said auxiliary-component moving means comprises a battery carrier which is fixed to a lower portion of said vehicle body in such a manner as to be capable of being cut off therefrom during a sudden deceleration of said vehicle, and is coupled to at least one of a plurality of auxiliary components, so as to move said auxiliary components by moving during a sudden deceleration of said vehicle.

16. A structure for arranging an auxiliary component of an electric vehicle according to claim 15, further comprising: a coupling-portion-movement restricting mechanism for restricting a direction of movement of a connecting portion for connecting said battery carrier to said auxiliary component.

17. A structure for arranging an auxiliary component of an electric vehicle, comprising:

a highly rigid member disposed in a front body of said electric vehicle;

an auxiliary component disposed in said front body; and auxiliary-component moving means for vertically moving at least a portion of said auxiliary component such that an overall length of said auxiliary component in a longitudinal direction of said vehicle becomes less than an overall length, in the longitudinal length of said vehicle, of a space formed by said highly rigid member in a case where said front body is compressed and deformed.

18. A structure for arranging an auxiliary component of an electric vehicle according to claim 17, wherein said auxiliary-component moving means comprises links, and a plurality of auxiliary components are coupled to each other by means of said links, coupling points at opposite ends of said links being arranged on both sides of a longitudinal axis of said vehicle.

19. A structure for arranging an auxiliary component of an electric vehicle according to claim 17, wherein said auxiliary-component moving means comprises a front hood which moves upwardly when said front body is compressed and deformed, an engaging portion provided in said front hood, and a portion to be engaged which is provided in at least one of said plurality of auxiliary components and engages said engaging portion when said front body is compressed and deformed.

20. A structure for arranging an auxiliary component of an electric vehicle according to claim 17, wherein said auxiliary-component moving means comprises brackets for mounting a plurality of auxiliary components in said front body along the longitudinal direction of said vehicle in a state in which said plurality of auxiliary components are inclined.

21. A structure for arranging an auxiliary component of an electric vehicle according to claim 17, wherein said auxiliary-component moving means comprises a bending-mode member on which a plurality of auxiliary components are mounted and which is adapted to be bent when said front body is compressed and deformed.

22. A structure for arranging an auxiliary component of an electric vehicle according to claim 17, wherein said auxiliary-component moving means comprises a battery carrier which is fixed to a lower portion of said vehicle body in such a manner as to be capable of being cut off therefrom during a sudden deceleration of said vehicle, and is coupled to at least one of a plurality of auxiliary components, so as to move said auxiliary Components by moving during a sudden deceleration of said vehicle.

23. A structure for arranging an auxiliary component of an electric vehicle according to claim 17, wherein said highly rigid member includes a motor.

24. A structure for arranging auxiliary components of an electric vehicle, comprising:

a plurality of auxiliary components disposed in a front body of said electric vehicle and arranged in the longitudinal direction of said vehicle; and auxiliary-component moving means for vertically moving at least one of said auxiliary components such that an overall length of said auxiliary components in a longitudinal direction of said vehicle becomes less than an original overall length of said auxiliary components in a case where said front body is compressed and deformed, said auxiliary-component moving means comprising links connecting at least two of said components.

25. A structure for arranging auxiliary components of an electric vehicle, comprising:

a highly rigid member disposed in a front body of said electric vehicle;

a plurality of auxiliary components disposed in said front body; and auxiliary-component moving means for vertically moving at least one of said auxiliary components such that an overall length of said plurality of auxiliary components in a longitudinal direction of said vehicle becomes less than an overall length, in the longitudinal length of said vehicle, of a space formed by said highly rigid member in a case where said front body is compressed and deformed, said auxiliary-component moving means comprising links connecting at least two of said components.

* * * * *